Patented July 29, 1952

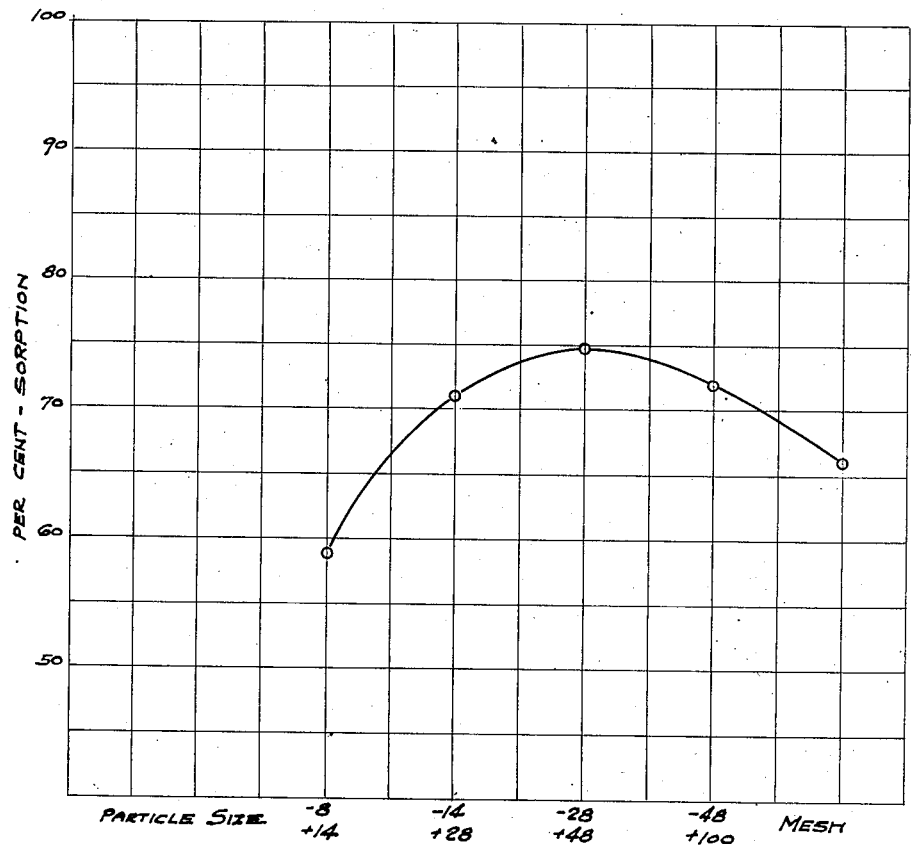

2,605,236

UNITED STATES PATENT OFFICE 2,605,236

METHOD FOR CONVERSION OF PORTLAND CEMENT KILN DUST TO AN ADSORBENT MATERIAL AND ADSORBENT MATERIAL MADE THEREBY

Henry C. McCants, Hartsdale, N. Y., assignor to Penn-Dixie Cement Corporation, New York, N. Y., a corporation of Delaware Application July 11, 1950, Serial No. 173,024

12 Claims. (Cl. 252—443)

1

This invention relates to a process for converting the waste flue dust from Portland cement kilns into a valuable adsorbent material, and to the material so made.

In the dry process for the manufacture of Portland cement, the raw material comprising a mixture of calcareous and argillaceous materials, is introduced into the upper end of a long, gently sloping, rotating kiln. At the opposite end of the kiln, burning gases are introduced, usually the products of combustion of powdered coal or coke. These move counter-current to the flow of raw cementitious material, causing conversion of that material into Portland cement. As the gases sweep up the kiln, they entrain from the stream of raw material certain fine particles which, with the fly ash from the fuel itself, are led out the upper end of the kiln. This mixture of fine cementitious materials and fly ash constitutes the so-called "cement kiln flue dust" and has hitherto been considered a waste material having no possible use. According to present practice it is ordinarily dumped in huge waste piles. The considerable expense of trucking it from the plant and of providing the land for the waste piles can easily be appreciated when it is considered that a cement plant of medium size may produce 25,000 tons of the material per year.

It has now been discovered that this flue dust, hitherto considered an expensive nuisance, can be converted into a valuable adsorbent material useful for the clarification of oils and for cleaning up oil spillage, as for example on roads and in shops and garages.

According to the invention, the flue dust, after it is removed from the kilns, is hydrated and carbonated. The carbonated and hydrated dust has itself considerable sorptive powers, but a vastly increased effectiveness is obtained if the material is formed into pellets which will pass through an 8 mesh screen and be retained on a 100 mesh screen. Preferably the material should pass through a 28 mesh screen and be retained on a 48 mesh screen.

In the drawing the graph shows the effect of pellet size on the sorption characteristics of the material.

The flue dust emerging from the upper end of the kiln includes, as noted above, a certain amount of fly ash from the fuel and entrained particles from various portions of the raw material stream. Its exact composition depends on a number of variable factors. Thus, some of the material may be drawn from minerals which have been nearly converted to cement while another part may be drawn from minerals which are nearly in their raw state. The proportion of the dust which comes from any given point along the kiln may vary from time to time according to the conditions of operation. Moreover, the exact composition of the raw material fed into the kiln will vary considerably depending upon the kind of cement which it is desired to produce and the geographical location of the plant. Thus, among the calcareous materials which are commonly used in cement manufacture may be listed limestone, marl, chalk, marine shells and alkali waste. Argillaceous materials which are used include clay, shale, slate, silica sand and blast furnace slag. Cement rock may be used in both capacities. It will therefore be seen that a definite chemical analysis of the flue dust cannot be given. Generally speaking, however, the flue dust as it comes from the kilns will have the following broad limits:

Silica, from about 21% to about 13% (by weight)
Alumina, from about 8% to about 3% (by weight)
Iron oxide ($Fe_2O_3$), from about 8% to about 2% (by weight)
Calcium oxide, from about 55% to about 37% (by weight)
Sulphur trioxide, from about 15% to about 2% (by weight)
Alkali oxides, from about 7% to about 1% (by weight)
Ignition loss, from about 13% to about 4% (by weight)

Traces of elemental sulphur may also be present. A representative analysis is:

*Chemical analysis of flue dust direct from rotary cement kilns*

| | Per cent by weight |
|---|---|
| Silica | 17.46 |
| Alumina | 6.29 |
| Iron oxide | 2.43 |
| Calcium oxide | 48.44 |
| Magnesium oxide | 2.55 |
| Sulphur trioxide | 12.14 |
| Sulphur | .04 |
| Sodium oxide | .48 |
| Potassium oxide | 3.25 |
| Ignition loss | 7.04 |

After hydration and carbonation, and as it is ready for use, the flue dust analysis will generally be within the following broad limits (per cent by weight):

Silica, from about 18% to about 10%
Alumina, from about 7% to about 2%
Iron oxide, from about 7% to about 1%
Calcium oxide, from about 46% to about 32%
Sulphur trioxide, from about 13% to about 1%
Alkali oxides from about 6% to about 1.0%
Ignition loss, from about 30% to about 19%

Traces of elemental sulphur may also be present. A representative analysis is:

*Chemical analysis of flue dust sufficiently hydrated and carbonated*

| | Per cent by weight |
|---|---|
| Silica | 15.66 |
| Alumina | 6.40 |
| Iron oxide | 1.90 |
| Calcium oxide | 45.02 |
| Magnesium oxide | 1.90 |
| Sulphur trioxide | 8.56 |
| Sulphur | .03 |
| Sodium oxide | .18 |
| Potassium oxide | .72 |
| Ignition loss | 19.76 |

As is the case with fuller's earth and similar natural adsorbents, however, the exact chemical percentages bear little or no relation to the adsorbent properties of the material.

The carbonation and hydration which are a part of the present process may be carried out in any one of several ways. One of the simplest ways is to collect the flue dust as it comes from the kilns and store it in the open air, exposed to the elements, for a period greater than about 12 weeks, preferably about 52 weeks. At the end of this time it will have taken up from about 1 to about 5% of its original weight of carbon dioxide and from about 15 to about 40% water, and will have assumed the physical appearance of dry putty. It is then dried until its total moisture content is from about 6.0 to about 17% by weight.

In general, the less water there is in the material the higher will be its adsorptivity. The extent to which the material is dried, therefore is dependent to a large extent on the demands of the particular user, and on whether the increased effectiveness is worth the cost of further drying.

It has been found that drying and sizing operations are best accomplished by first crushing the material taken from the waste piles to particles of approximately 1" in diameter. The 1" particles are then subjected to drying and in their dried condition are further reduced to use size.

In the reduction of the original material to 1" size and in the further grinding of the 1" material to use size, it has been found that a considerable amount of dust is produced. This dust may itself be used by adding water to form a paste of extrudable consistency, extruding the paste through a suitable screen to form pellets of use size and drying these pellets along with fresh 1" material. To body the dust, from about 1.0 to about 10%, preferably about 5% Portland cement may be added.

If it is desired to avoid the weathering operations, artificial carbonation and hydration may be carried out by wetting the flue dust to a paste of extrudable consistency, extruding the paste through a suitable screen, to form pellets of use size and carbonating and drying the pellets so formed. In carbonating and drying the pellets produced in this process, use may advantageously be made of the exhaust gases from rotary cement kilns having a high carbon dioxide content.

Mention has been made above of an optimum particle size. In this respect it has been found that surprisingly enough there is a definite range of particle size, which has more than half again as great a sorptive capacity as powdered flue dust. To demonstrate this, hydrated flue dust having a particle size through 200 mesh was extruded into various sized pellets ranging from +8 mesh to +200 mesh. 75 grams of graded material were placed in a 91 mm. Buechner funnel and on to the material 154 cc. of turbine oil were run. The oil was allowed to drain until the flow ceased. The drained oil was weighed and the percent retained determined. The results of this investigation are set out graphically in the drawing. The unpelleted flue dust itself takes up about 45% of the oil. On the other end of the scale, the pellets retained on an 8 mesh screen took up about 58% of the oil. Surprisingly enough, however, material which had been sized to pass through a 28 and to remain on a 48 mesh screen took up about 75% of the oil added.

The drying operations in all processes are generally conducted by subjecting the material either in 1" size or smaller to a stream of hot gases. Advantageously, these gases may be drawn from the cement kiln itself, and where the material is to be artificially carbonated, carbonation and drying may take place simultaneously. The temperature at which the material is dried has little significance on its adsorptive powers. It has generally been found satisfactory to heat the material to a temperature of from about 250 to about 350° F. for from about 1¼ to about 1½ hours, but there is no indication that a longer drying at a lower temperature or a shorter drying at a higher temperature would not be equally satisfactory. In general, temperature and time of drying are interrelated so that drying time will vary inversely with the temperature. The exact sequence of the steps is also not critical and may be carried out as convenient. Of course, where carbonation and hydration are carried out by weathering, these steps are done before the drying.

It is possible to hydrate and carbonate the material by exposure to a controlled atmosphere which will give an equilibrium condition where the precise amount of moisture and carbonation desired is taken up by the material. In such case a subsequent drying is not necessary.

The material produced according to my novel process is especially valuable for cleaning up oil spillage, as for example in shops and garages. It may also be used for the same purpose on roads. Further, it may be used as a filter medium for oil clarification except where its soluble constituents may be harmful if dissolved by the oil. It also provides a cheap and readily obtainable decontaminant for areas wherein poisonous liquids and chemicals have been spilled or sprayed.

What I claim is:

1. A process for making an adsorbent from cement kiln flue dust which comprises the steps of carbonating the dust, hydrating the dust, forming the dust into pellets substantially all of which will pass through an 8 mesh screen and be retained on a 100 mesh screen, and regulating the total water content of the pellets at about 6.0 to about 17 per cent by weight.

2. A process as claimed in claim 1 wherein the dust is formed into pellets substantially all of which will pass through a 28 mesh screen and be retained on a 48 mesh screen.

3. A process for making an adsorbent from cement kiln flue dust which comprises weathering said dust for more than about 12 weeks and then drying until the total water content is from about 6.0 to about 17 per cent by weight and pelleting the weathered dust to form pellets substantially all of which will pass through an 8 mesh screen and be retained on a 100 mesh screen.

4. A process as claimed in claim 3 wherein the dust is reduced to pellets substantially all of which will pass through a 28 mesh screen and be retained on a 48 mesh screen.

5. A process for making an adsorbent from cement kiln flue dust which comprises weathering said dust for more than about 12 weeks with resulting consolidation, crushing the weathered dust to form particles from about ¼ to about 1 inch in diameter, drying the crushed material until the total water content is from about 6.0 to about 17 per cent by weight and further reducing the dried material to pellets substantially all of which will pass through an 8 mesh screen and be retained on a 100 mesh screen.

6. A process for making an adsorbent from cement kiln flue dust which comprises weathering said dust for more than about 12 weeks with resulting consolidation, crushing the weathered dust to a particle size of from about ¼ inch to about 1 inch with the production of a hydrated dust, drying the crushed material until the total water content is from about 6.0 to about 17 per cent by weight and further reducing the size of said dried material to particles substantially all of which will pass through an 8 mesh screen and be retained on a 100 mesh screen with the formation of additional hydrated dust, combining the dust resulting from said crushing operation with that resulting from said reduction, adding water to the combined dust to form a paste, extruding the paste to form particles substantially all of which will pass through a 1 inch mesh screen and be retained on a ¼ inch mesh screen, drying said extruded particles in admixture with fresh crushed material until the total water content is from about 6 to about 17 per cent by weight and further reducing the particle size of said mixture so that substantially all particles will pass through an 8 mesh screen and be retained on a 100 mesh screen.

7. A process as claimed in claim 6 wherein to the mixed dusts is added from about 1.0 to about 10% Portland cement.

8. A process for making an adsorbent from cement kiln flue dust which comprises wetting said dust, contacting said dust with carbon dioxide, extruding the wetted dust to form pellets substantially all of which will pass through an 8 mesh screen and be retained on a 100 mesh screen, and regulating the total water content of the pellets at about 6.0 to about 17 per cent by weight.

9. A process for making an adsorbent from cement kiln flue dust which comprises wetting said dust, extruding the wetted dust to form pellets substantially all of which will pass through an 8 mesh screen and be retained on a 100 mesh screen, and contacting the extruded pellets with a hot gas containing carbon dioxide whereby said pellets are carbonated and dried until the total water content is from about 6.0 to about 17 per cent by weight.

10. A process as claimed in claim 9 wherein the dust is extruded to form pellets substantially all of which will pass through a 28 mesh screen and be retained on a 48 mesh screen.

11. An article of manufacture comprising pellets of carbonated flue dust from cement kilns having a total water content from about 6.0 to about 17 per cent by weight and substantially all having a size such that they will pass through an 8 mesh screen and be retained on a 100 mesh screen.

12. An article of manufacture comprising pellets of carbonated flue dust from cement kilns having a total water content from about 6.0 to about 17 per cent by weight and substantially all having a size such that they will pass through a 28 mesh screen and be retained on a 48 mesh screen.

HENRY C. McCANTS.

REFERENCES CITED

The following references are of record in the file of this patent:

UNITED STATES PATENTS

| Number | Name | Date |
|---|---|---|
| 753,385 | Gerdes | Mar. 1, 1904 |
| 941,630 | Edison | Nov. 30, 1909 |
| 1,935,961 | Urbain | Nov. 21, 1933 |
| 2,329,940 | Ponzer | Sept. 21, 1943 |
| 2,469,512 | Naugle | May 10, 1949 |
| 2,477,262 | Mooser | July 26, 1949 |

OTHER REFERENCES

Kondo et al., "Soc. of Glass Technology," vol. 18, pages 7–7A, 1934.